United States Patent Office.

VICTOR RILLET, OF HOBOKEN, NEW JERSEY.

Letters Patent No. 95,605, dated October 5, 1869.

IMPROVED SIRUP FOR FLAVORING BEVERAGES, &c.

The Schedule referred to in these Letters Patent and making part of the same

*To all whom it may concern:*

Be it known that I, VICTOR RILLET, of Hoboken, in the county of Hudson, and State of New Jersey, have invented a new and useful Sirup for Drinking and Flavoring-Purposes; and I do hereby declare the following to be a clear and exact description of the same, which will enable others skilled in the art to which my invention appertains, to fully understand and make the same.

In carrying out my invention, I take a sufficient quantity of pomegranates, press them, and allow the mass to ferment.

The juice is drawn off and clarified by glue and the white of eggs, or any other suitable material, but I prefer to use the glue and eggs, since they do not injure the flavor or quality of the product.

In the clarified matter, I dissolve sufficient sugar, by preference white crushed, in such proportions as to make a sirup weighing, when cold, 34° Baumé, using the water-bath heated to 50° centigrade. The sirup is then filtered.

I make a hydro-alcoholic extract of vanilla and cochineal, in the proportion of one ounce of each to one pint of diluted alcohol acidulated with tartaric acid.

The latter preparation is added to the prepared sirup, in the proportion of one ounce of the former to one gallon of the latter.

It will be found that this compound sirup is delicious in flavor, and forms a refreshing drink, whether mixed with soda or ordinary water. It is also useful for general flavoring-purposes.

Having thus described my invention,

What I claim as new, and desire to secure by Letters Patent, is—

The within-described sirup, made of the ingredients, and compounded substantially as described.

The above signed by me, this     day of July, 1869.

V. RILLET.

Witnesses:
JOHN A. WIEDERSHEIM,
P. H. WAYNE.